United States Patent
Ohkawa et al.

(10) Patent No.: US 6,791,635 B1
(45) Date of Patent: Sep. 14, 2004

(54) SURFACE LIGHT SOURCE DEVICE OF SIDE LIGHT TYPE AND LIQUID CRYSTAL DISPLAY

(75) Inventors: Shingo Ohkawa, Koshigaya (JP); Kazumasa Ohsumi, Hatogaya (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 09/273,449

(22) Filed: Mar. 22, 1999

(30) Foreign Application Priority Data

Mar. 26, 1998 (JP) .......................................... 10-098383

(51) Int. Cl.[7] .......................................... G02F 1/1335
(52) U.S. Cl. .............................. 349/61; 349/63; 362/31
(58) Field of Search ........................ 349/63, 65; 362/31

(56) References Cited

U.S. PATENT DOCUMENTS

| | | | | |
|---|---|---|---|---|
| 3,963,312 A | * | 6/1976 | Wild ............................ | 349/97 |
| 5,341,231 A | * | 8/1994 | Yamamoto et al. ........... | 359/49 |
| 5,450,292 A | | 9/1995 | Yokoyama et al. | |
| 5,479,281 A | * | 12/1995 | Wiltshire et al. ............. | 349/96 |
| 5,608,837 A | * | 3/1997 | Tai et al. ...................... | 385/146 |
| 5,671,994 A | * | 9/1997 | Tai et al. ...................... | 362/31 |
| 5,703,667 A | * | 12/1997 | Ochiai .......................... | 349/65 |
| 5,886,759 A | * | 3/1999 | Mashino et al. .............. | 349/65 |
| 5,961,198 A | * | 10/1999 | Hira et al. .................... | 362/31 |
| 5,995,180 A | * | 11/1999 | Moriwaki et al. ............. | 349/96 |
| 6,099,134 A | * | 8/2000 | Taniguchi et al. ............ | 362/31 |
| 6,104,454 A | * | 8/2000 | Hiyama et al. ............... | 349/65 |
| 6,108,059 A | * | 8/2000 | Yang ............................ | 349/65 |
| 6,151,089 A | * | 11/2000 | Yang et al. ................... | 349/113 |
| 6,288,760 B1 | * | 9/2001 | Sawayama .................... | 349/63 |
| 6,522,373 B1 | * | 2/2003 | Hira et al. .................... | 349/65 |

FOREIGN PATENT DOCUMENTS

| | | |
|---|---|---|
| CN | 230 570 | 9/1994 |
| CN | 289 802 | 11/1996 |
| EP | 561 329 | 9/1998 |
| JP | 10-123519 | * 5/1998 |
| JP | 10-142601 | * 5/1998 |

* cited by examiner

Primary Examiner—Robert H. Kim
Assistant Examiner—David Chung
(74) Attorney, Agent, or Firm—Staas & Halsey LLP

(57) ABSTRACT

A LCD comprises a surface light source device of side light type for auxiliary lighting. A fluorescent lamp is turned on to supply primary light to be introduce into a guide plate. A back face (upper face) of the guide plate provides a light control face including an emission promoting surface to promote emission from an illumination output face (lower face). The illumination output face provides a specular face without scattering power. Illumination light L2 introduced into the guide plate escapes gradually from the back face and the illumination output face on the way of propagation. Some of illumination light emitted from the illumination output face reaches a reflection plate after transmitting a liquid crystal cell and polarization plates. Quantity of light reaching the reflection plate depends on directions of transmission polarization planes of first and second polarization plates as well as state of a liquid crystal layer (depending on voltage applied to transparent electrodes). The reflection plate reflects and scatters illumination output light. Some of thus reflected and scattered illumination output light is emitted out of the device after transmitting a polarization plate, the liquid crystal cell, the guide plate and another polarization plate in order, thereby contributing to displaying. The light control face (back face) is provided with emission promoting property to promote escaping of light L2 from the illumination output face. This emission promoting property is provided so as to be once getting stronger according to distance from an incidence end face 25A and to be followed by getting weaker. In another arrangement, a guide plate is disposed outside of a polarization plate in front of a liquid crystal cell or is interposed between the liquid crystal cell and another polarization plate on the back side thereof.

26 Claims, 8 Drawing Sheets

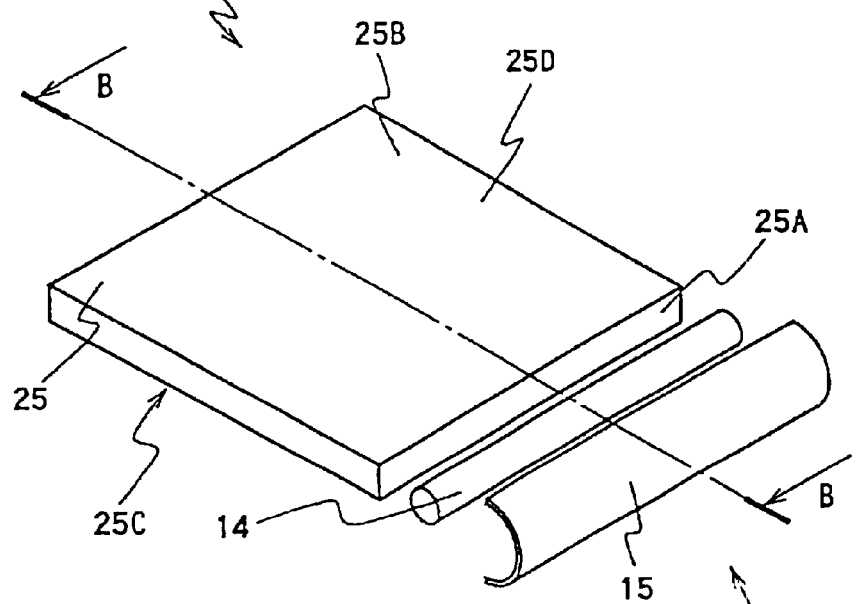
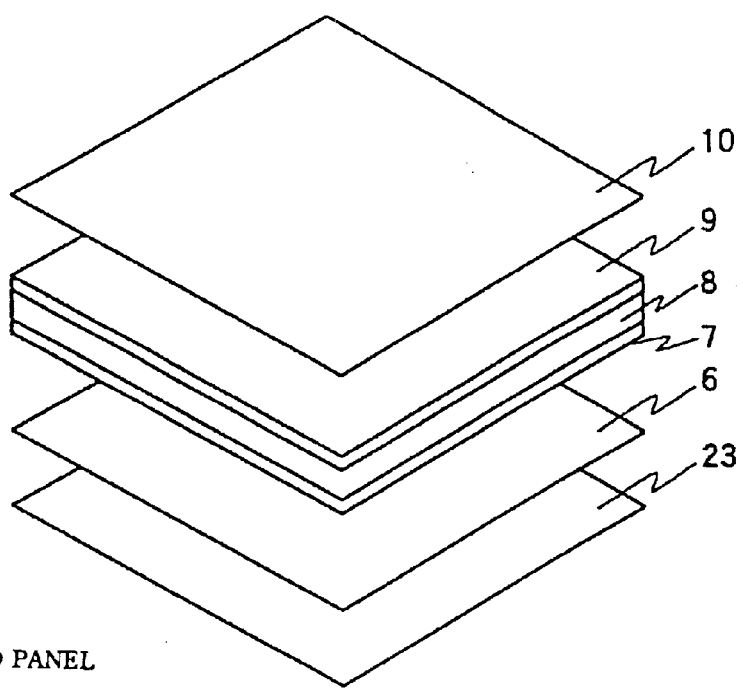
Fig. 1

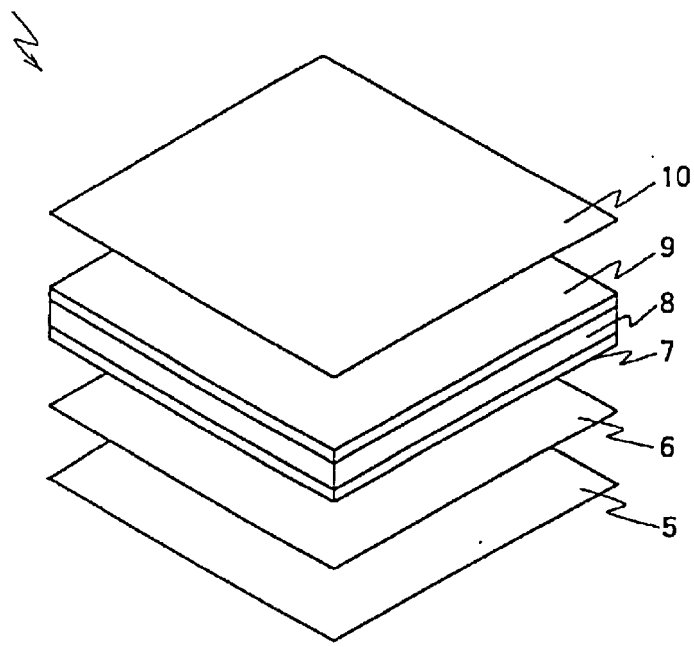
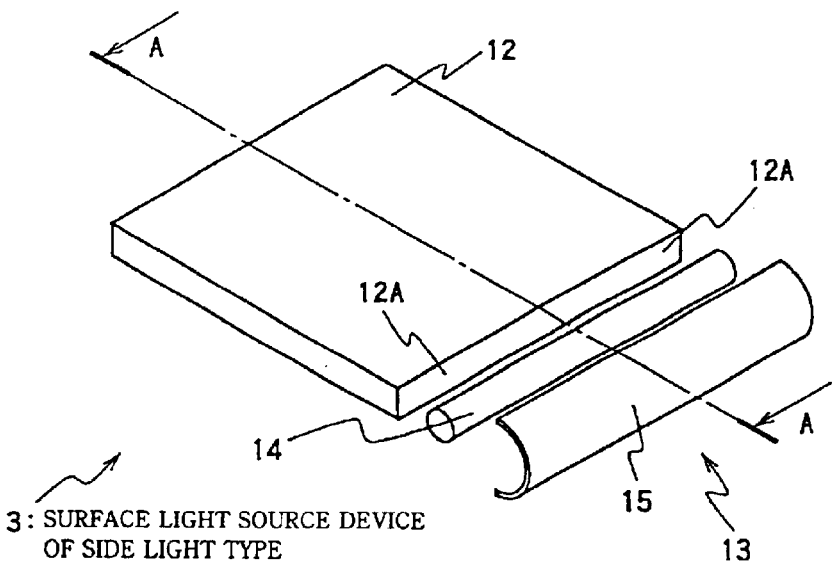
Fig. 8 (Prior Art)

SURFACE LIGHT SOURCE DEVICE OF SIDE LIGHT TYPE AND LIQUID CRYSTAL DISPLAY

BACKGROUND

1. Field of Invention

The present invention relates to a surface light source device of side light type and a liquid crystal display, in particular, to a surface light source device of side light type which is applied to an auxiliary illumination arrangement in a liquid crystal display and to a liquid crystal display equipped with the light source device.

2. Related Art

Liquid crystal displays of a known type employ a transmission-type liquid crystal and ones of another known type employ a reflection-type liquid crystal. In general, the latter permits consumption of electric power to be much saved as] compared with the former, because ambient light can be utilized for image formation. And it is known that an auxiliary illumination device is mounted on the liquid crystal display to enable the display to perform displaying under the condition of short ambient light such as at night.

So-called surface light source devices of the side light type are suitable for such an application. This is because of their structure such that a primary light source and a guide plate are arranged side by side to add only a very small thickness to the liquid crystal display. It is known that a reflection-type liquid crystal may function supplementally as a transmission-type liquid crystal when a surface light source device of side light type applied to auxiliary illumination is switched on.

FIG. 8 and FIG. 9 illustrate an example of conventional surface light source device of side light type which is structured according to the above manner. Referring to FIGS. 8 and 9, a liquid crystal display 1 comprises a surface light source device of side light type arranged behind a liquid crystal display panel 2. That is, the surface light source device 3 provides an auxiliary illumination means. The liquid crystal display 1 is viewed from above FIGS. 8 and 9.

The liquid crystal display panel 2 comprises a transmission-reflection plate 5, a polarization plate 6, a glass substrate 7, a liquid crystal layer 8, another glass substrate 9 and another polarization plate 10 which are disposed laminatedly in order. In these members, the transmission-reflection plate 5 is located at the closest position to the surface light source device 3.

Transparent electrodes are formed on surfaces of the glass substrates 7 and 9, respectively, providing transparent electrode patterns between which a liquid crystal material is interposed and sealed to form the liquid crystal layer 8.

The liquid crystal display panel 2 provides liquid crystal cells with matrix-like arrangement and each of the cells rotates a polarization plane of light transmitting therethrough depending on voltage applied to the transparent electrodes.

In general, the polarization plates 6 and 10 are orientated so that the transmission polarization plane of the polarization plate 6 is either perpendicular or parallel to that of the polarization plate 10.

Each of the polarization plates 6 and 10 permits a component corresponding to a certain direction of polarization plane (transmission polarization plane) to transmit exclusively.

The transmission-reflection plate 5 is a member provided with both transmissivity and reflectivity, being arranged so that scattering power and high reflectance is demonstrated with respect to light which is transmitted through the liquid crystal cells while being demonstrated high transmissivity with respect to light which is supplied from the surface light source device 3.

On impinging of ambient light L1 to the liquid crystal display panel from above in FIG. 9, some component of the ambient light transmits through the polarization plate 10, the glass substrate 9, the liquid crystal layer 8, the glass substrate 7 and the polarization plate 6 to reach the transmission-reflection plate 5.

Quantity of light reaching the transmission-reflection plate 5 depends on factors including directions of transmission polarization planes of the polarization plates 6, 10 and state of the liquid crystal layer 8 (depending on voltage applied to the transparent electrodes).

The transmission-reflection plate 5 scatters and reflects ambient light L1. However, it involves partial transmission therethrough, because the transmission-reflection plate 5 is provided with transrnissivity as well.

Some component of the scattered and reflected light transmits through the polarization plate 6, the glass substrate 7, the liquid crystal layer 8, the glass substrate 9 and the polarization plate 10 in order, being emitted toward the outside to contribute to displaying.

Quantity of light emitting toward the outside varies depending on factors including directions of transmission polarization planes of the polarization plates 10, 6 and state of the liquid crystal layer 8 (depending on voltage applied to the transparent electrodes). According to this principle, bright-dark distribution is formed to provide image to be viewed.

The surface light source device 3 is switched on usually when ambient light is short. In the illustrated arrangement, the surface light source device 3 functions as a back-lighting means. The surface light source device 3 comprises a guide plate 12 and a primary light source disposed beside the guide plate.

The primary light source 13 is composed of, for instance, a fluorescent lamp (cold cathode lamp) 14 and a reflector 15 backing the lamp. When the fluorescent lamp 14 is turned on, primary light is introduced into the guide plate 12 through an opening of the reflector 15 and an end face 12A of the guide plate. The guide plate 12 is, for example, made of a transparent resin such as acrylic resin. Alternatively, a scattering guide plate having scattering power inside is employed occasionally.

In the illustrated case, the guide plate 12 has a roughened back face (the lower face in FIG. 9). Illumination light L2 introduced into the guide plate 12 is diffused and reflected at the back face and is emitted from an illumination output face (the upper face in FIG. 9) on the way of propagation. A reflection member (not shown) is disposed along the back face of the guide plate 12 occasionally.

As required, an additional member such as a prism sheet or a light diffusion sheet is disposed along the illumination output face of the guide plate 12 in order to modify directivity of emission.

Some of the outputted illumination light from the surface light source device 3 transmits through the transmission-reflection plate 5. Then some component of it is emitted toward the outside after transmitting along paths (polarization plate 6→glass substrate 7→liquid crystal layer 8→glass substrate 9→polarization plate 10) similar to those of ambient light L1, thereby contributing to displaying.

Quantity of light emitting toward the outside varies, in the same manner as that of ambient light L1, depending on factors including directions of transmission polarization planes of the polarization plates 10, 6 and state of the liquid crystal layer 8 (depending on voltage applied to the transparent electrodes). According to this principle, bright-dark distribution is formed to provide image to be viewed.

A problem with the above-described conventional liquid crystal display 1 is that ambient light is utilized at a low efficiency. This is because the transmission-reflection plate 5 disposed at the back side of the polarization plate 6 for auxiliary illumination has transmissivity which allow some of ambient light L1 to be leaked out. Needless to say, this leakage leads to reduction in quantity of light contributing to displaying, thereby lowering contrast of display. In particular, color image displaying LCDs will suffer from an inferior display quality brought by short brightness and low contrast.

OBJECT AND SUMMARY OF INVENTION

The present invention has been proposed under the aforesaid background. An object of the present invention is to provide a liquid crystal display, which operates to display images with high brightness and high contrast as well as with small photo-energy loss, and a surface light source device of side light type to be mounted on the display.

A surface light source device of side light type in accordance with the present invention is applied to auxiliary lighting crystal display comprising a liquid crystal display panel. The surface light source device comprises a guide plate and a primary light source supplying primary light to an incidence end face, which is provided by a minor face of the guide plate. Major faces of the guide plate provides an illumination output face and a back face.

According to a feature of the present invention, the illumination output face of the guide plate has non-scattering property and performs light supply light to a front face of the liquid crystal display panel. And the back face of the guide plate provides a light control face having emission promoting property which helps light propagating within the guide plate to be escaped from the illumination output face. This emission promoting property preferably tends to be more intensive according to distance from the incidence end faces of the guide plate.

In a typical embodiment, the light control face includes a great number of fine regions to promote emission. The fine regions are preferably arranged with irregularity. The fine regions may be roughened regions partially occupying the back face. Each fine region is preferably provided with almost invisible dimension.

The surface light source device of side light type, which may be variously embodied as above, can be arranged so that output light from the illumination output face is supplied toward the front of a liquid crystal display panel, providing a liquid crystal display in accordance with the present invention.

Besides, the present invention provides a liquid crystal display equipped with the surface light source device of side light type according to an improved arrangement. The liquid crystal display comprises a liquid crystal display panel and a surface light source device of side light type for auxiliary illumination, the panel including a crystal layer and a polarization plate disposed at the front side of the liquid crystal layer.

The surface light source device of side light type comprises a guide plate and a primary light source supplying primary light to an incidence end face which is provided by a minor face of the guide plate, the guide plate having major faces to provide a back face and an illumination output face. And the guide plate is interposed between the liquid crystal layer and the polarization plate to provide an improved arrangement so that the illumination output face is directed to the liquid crystal layer.

The illumination output face of the guide plate has non-scattering properties while the back face of the guide plate provides a light control face having emission promoting properties which help light propagating within the guide plate to escape from the illumination output face. The guide plate may be provided with "non-scattering properties" and "emission promoting properties" according to other styles. The back may be provided with "non-scattering properties" while the illumination output face may be provided with "emission promoting properties".

Such an improved arrangement also allows the liquid crystal display to have "emission promoting properties" embodied in various manners.

First, these emission promoting properties preferably tend to be more intensive according to distance from the incidence end faces of the guide plate. Next, the light control face may include a great number of fine regions to promote emission. The fine regions are preferably arranged with irregularity. The fine regions may be roughened regions partially occupying the back face. Each fine region is preferably provided with almost invisible dimensions.

The aforementioned and other features of the present invention will be understood in more detail from the following description with the accompanied drawings.

BRIEF DESCRIPTION OF DRAWINGS

FIG. 1, is an exploded perspective view of a liquid crystal display in accordance with an embodiment of the present invention;

FIG. 8 is an exploded perspective view of a conventional liquid crystal display which employs a reflection-type liquid crystal.

EMBODIMENTS

Figure 2:
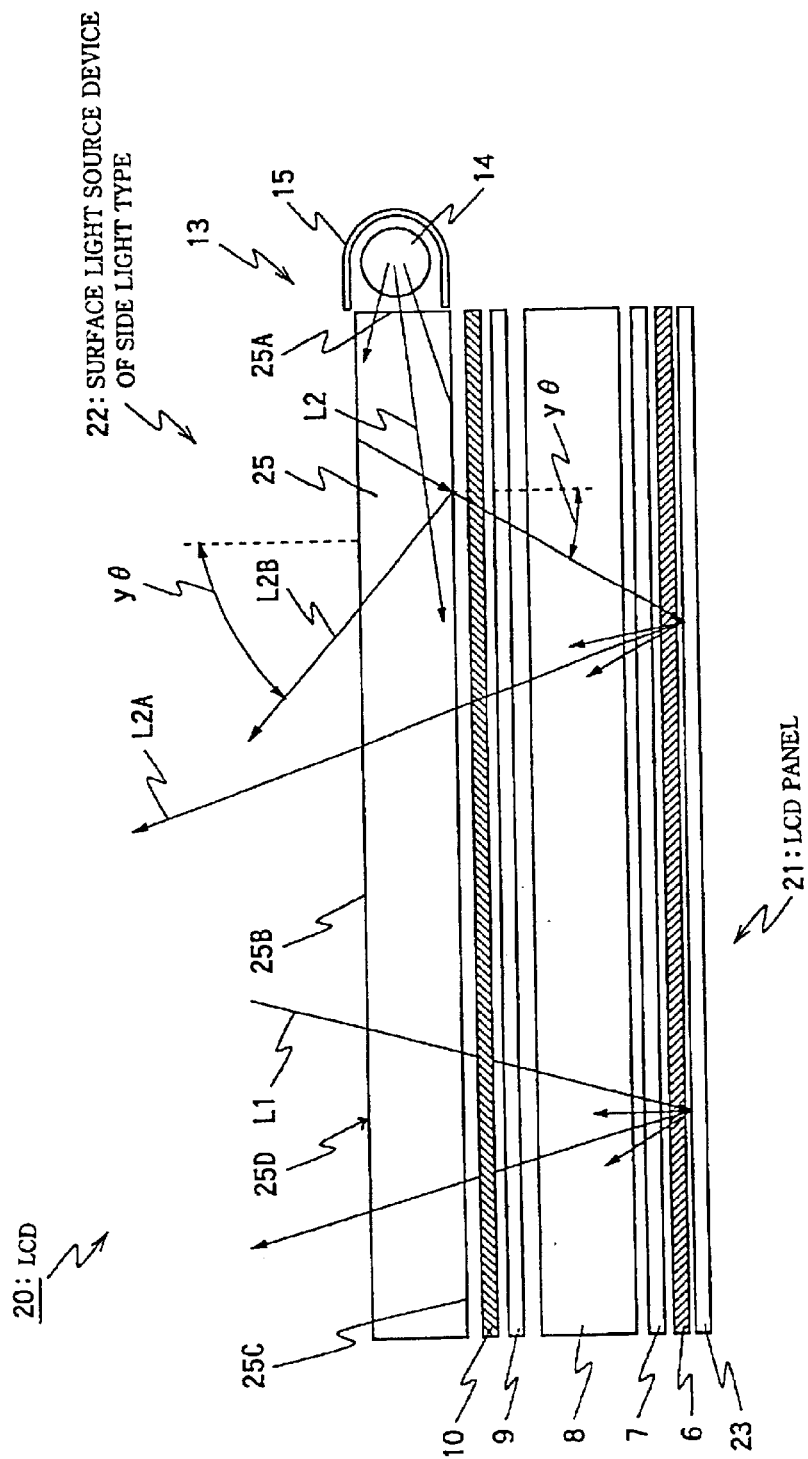
FIG. 2 is a cross section view along line B—B indicated in FIG. 1.
Figure 9:
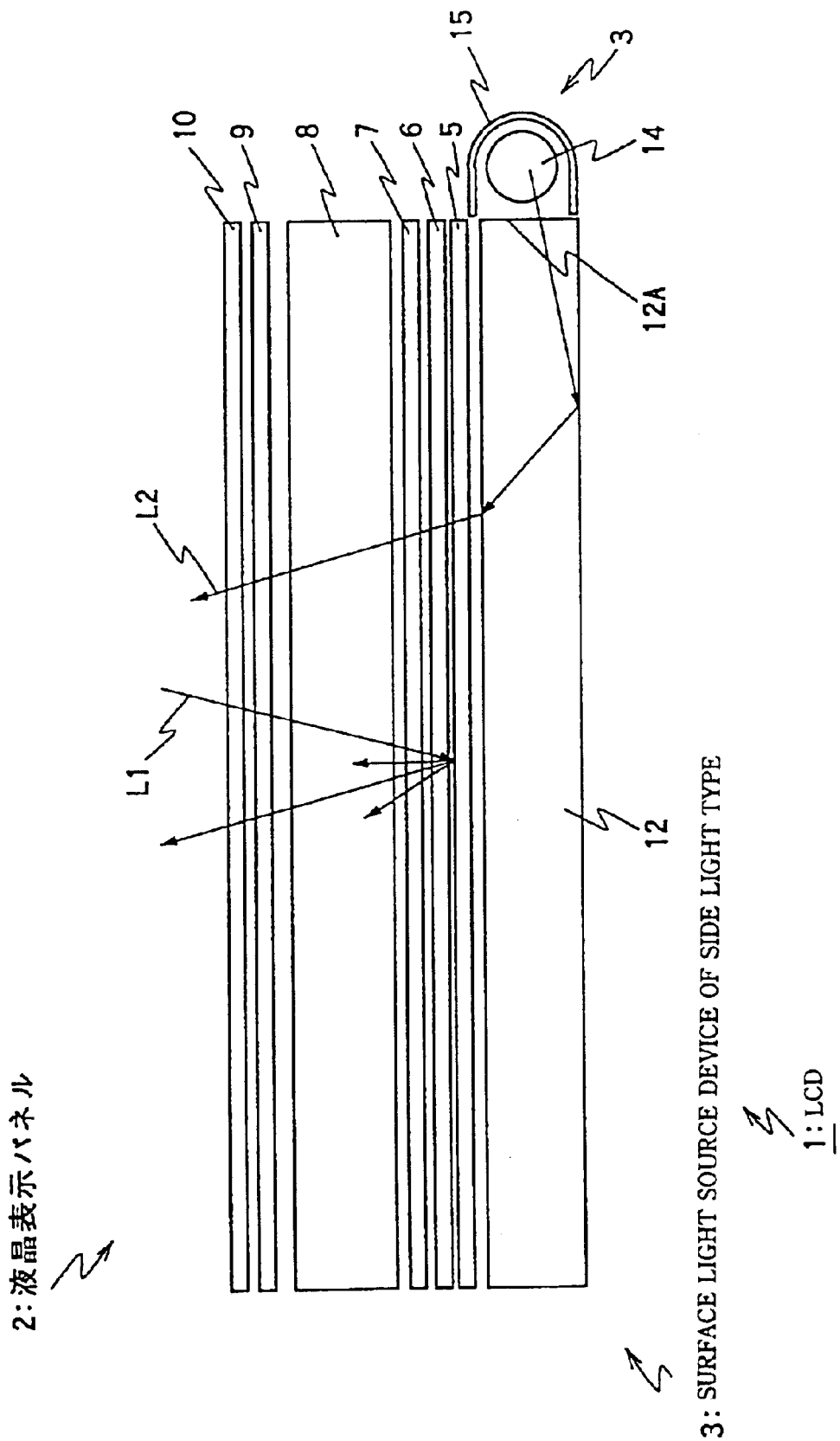
FIG. 9 is a cross section view along line C—C indicated in FIG. 8.

Referring to FIGS. 1 and 2, illustrated is a liquid crystal display in accordance with an embodiment of the present invention. Elements used in common to the arrangement shown in FIG. 8 or FIG. 9 are indicated by common references, with repeated descriptions being simplified.

A liquid crystal display 20 comprises a surface light source device of side light type 22 disposed in front of (i.e. at the viewing side of) a liquid crystal display panel 21. That is, the surface light source device 22 provides an auxiliary front-lighting unit. The liquid crystal display is viewed from above in FIGS. 1 and 2.

The liquid crystal display panel 21 comprises a reflection plate 23, a first polarization plate 6, a glass substrate 7, a liquid crystal layer 8, another glass substrate 9 and a second polarization plate 10 which are disposed laminatedly in order. In these members, the second polarization plate 10 is located at the closest position to the surface light source device 22.

Transparent electrodes are formed on surfaces of the glass substrates 7 and 9, respectively, providing transparent electrode patterns between which a liquid crystal material is interposed and sealed to form the liquid crystal layer 8.

The liquid crystal display panel 21 provides liquid crystal cells with matrix-like arrangement and each of the cells rotates a polarization plane of light transmitting therethrough depending on voltage applied to the transparent electrodes.

Each of the polarization plates 6 and 10 permits a component corresponding to a certain direction of polarization plane (transmission polarization plane) to transmit exclusively.

In general, the polarization plates 6 and 10 are orientated so that the transmission polarization plane of the first polarization plate 6 is either perpendicular or parallel to that of the second polarization plate 10.

The reflection plate 23 is a member provided with scattering properties and high reflectivity with respect to light which is transmitted through the liquid crystal cells, being produced, for example, by applying vapor-evaporation of a metal material such as Ag or Al, onto a roughened surface of the substrate of the reflection plate 23. This reflection plate 23 is employed instead of the transmission-reflection plate 5, which is employed in the arrangement shown in FIGS. 8 and 9, and has no transmissivity.

On impinging of ambient light L1 to the liquid crystal display panel from above in FIG. 2, some component of the ambient light transmits through the polarization plate 10, the glass substrate 9, the liquid crystal layer 8, the glass substrate 7 and the polarization plate 6 to reach the reflection plate 23.

Quantity of light reaching the reflection plate 23 depends on factors including directions of transmission polarization planes of the polarization plates 6, 10 and state of the liquid crystal layer 8 (depending on voltage applied to the transparent electrodes).

The reflection plate 23 scatters and reflects ambient light L1. Substantially no light transmits through the reflection plate 23. Some component of the scattered and reflected light transmits through the polarization plate 6, the glass substrate 7, the liquid crystal layer 8, the glass substrate 9 and the polarization plate 10 in order, being emitted toward the outside to contribute to displaying.

Quantity of light emitting toward the outside varies depending on factors including directions of transmission polarization planes of the polarization plates 10, 6 and state of the liquid crystal layer 8 (depending on voltage applied to the transparent electrodes).

According to this principle, bright-dark distribution is formed to provide images to be viewed.

The surface light source device 22 is switched on usually when ambient light is short. The surface light source device 22 comprises a guide plate 25 and a primary light source 13 disposed beside the guide plate.

The primary light source 13 is composed of, for instance, a fluorescent lamp (cold cathode lamp) 14 and a reflector 15 backing the lamp. When the fluorescent lamp 14 is turned on, primary light is introduced into the guide plate 25 through an opening of the reflector 15 and an end face 25A of the guide plate. The guide plate 25 is, for example, made of a transparent resin such as acrylic resin.

In the present embodiment, a back face (the upper face in FIG. 2) 25B of the guide plate 25 provides a light control face 25D which includes an emission promoting face helping emission from an illumination output face 25C. Details of the light control face 25D is described later. On the other hand, the illumination output face 25C is a specular face having substantially no scattering power.

Illumination light L2 introduced into the guide plate 25 goes back and forth repeatedly between the back face 25B (light control face 25D) and the illumination output face 25C on the way of propagation. This process involves gradual emitting from the illumination output face 25C.

Some of the outputted illumination light from the illumination output face 25C transmits through the polarization plate 10, the glass substrate 9, the liquid crystal layer 8, the glass substrate 7 and the polarization plate 6, reaching the reflection plate 23.

The quantity of light reaching the reflection plate 23 depends on factors including directions of transmission polarization planes of the polarization plates 10, 6 and the state of the liquid crystal layer 8 (depending on voltage applied to the transparent electrodes).

The reflection plate 23 scatters and reflects the outputted illumination light. Substantially no light transmits through the reflection plate 23. Some components of the scattered and reflected light transmits through the polarization plate 6, the glass substrate 7, the liquid crystal layer 8, the glass substrate 9, the polarization plate 10 and the guide plate 25 in order, being emitted toward the outside to provide light L2A to contribute to displaying.

The quantity of light emitting toward the outside varies depending on factors including directions of transmission polarization planes of the polarization plates 10, 6 and state of the liquid crystal layer 8 (depending on voltage applied to the transparent electrodes). According to this principle, bright-dark distribution is formed to provide images to be viewed.

The light control face 25D is provided with emission promoting properties to promote emission of illumination light L2. These emission promoting properties tend to be at first stronger according to distance from the incidence face 25A and to be weaker thereafter. The reason why weaker emission promoting properties are assigned around a distal end is that illumination output is generally increased around the distal end as a distal end face brings reflection light thereabout.

Emission promoting regions are distributed on the back face 25B according to a light control pattern. The light control pattern is designed so that the above tendency is realized. An example of the light control pattern according to the present invention is illustrated in FIG. 3a.

Referring to FIG. 3a, each emission promoting region on the back face 25B has a shape like a fine dot. A great number of fine dots are distributed so that covering rate (covering area per unit area) tends to be at first increased according to distance from the incidence face 25A and to be reduced thereafter, as shown in FIG. 3b. Such distribution realizes the aforesaid tendency.

Each emission promoting region consists of, for instance, a fine mat-processed region. Size of the dot-like fine region is so small as to be invisible if observation is attempted from the back face side. It is also preferable that this size is smaller than the structural period of the liquid crystal cells. Dot size (diameter) is practically less than 80 $\mu$m and is preferably, in particular, less than 35 $\mu$m.

FIG. 3b shows a curve illustrating the covering of dots according to design. According to a manner of design, first and foremost, a guide plate 25 without light control pattern 27 is measured for intensity distribution of light going toward the frontal direction with respect to the illumination output face 25C. The emission promoting face modifies this intensity distribution and improves the output efficiency of illumination.

Under considerations of the measured intensity distribution, variation of the covering rate is calculated so that a desirable intensity distribution is realized. In a typical case, approximately uniform distribution of illumination is desired. Then, a grid is set at pitches varying according to the calculated changing of covering rate.

An example of such a grid is shown with broken lines in FIG. 3a. A constant number of (for example, one) dots (fine emission promoting regions) are allotted and arranged for each grid cell. Dot arrangement is determined preferably so that no periodic regularity appears. Such irregular dot arrangement prevents Moire fringes which might be generated in connection with a fine periodic structure of the liquid crystal cells.

The peak (the maximum covering rate) in the graph of FIG. 3b preferably does not mark an excessively high score. This is because excessively high covering rate will increase direct escape from the back face 25B toward the frontal direction (toward the upper direction of FIG. 2) and will thereby impede the illumination promotion function for promoting emission from the illumination output face 25C.

Besides, high covering rate will effect strong light diffusion which might make the displayed image blurred. From such a viewpoint, it is practical to employ a design such that the maximum covering rate is not larger than 50%, and it is preferably that the maximum covering rate is not larger than 20%, for example no larger than 10%.

Figure 3:
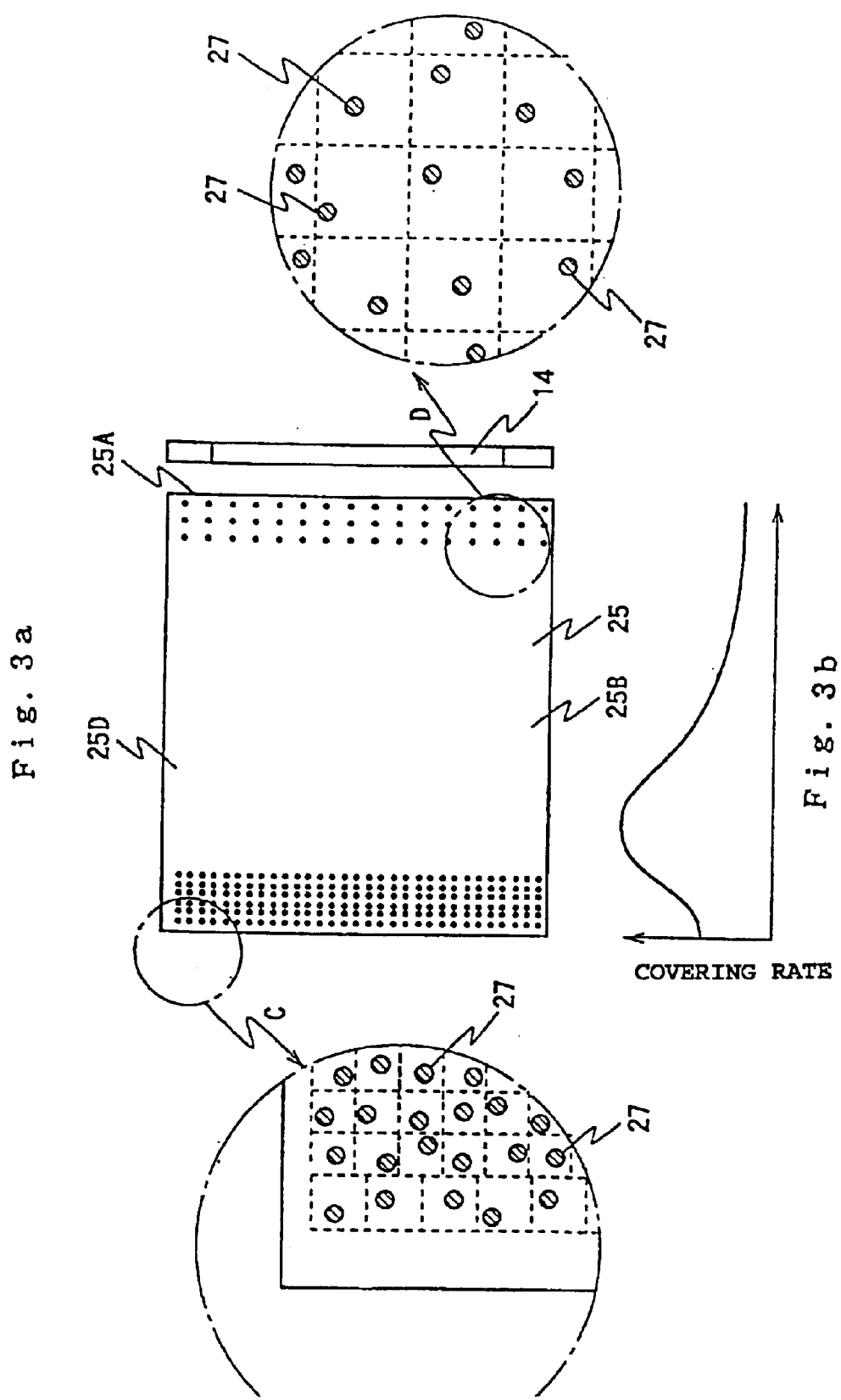
FIG. 3a is a plan view illustrating a light control pattern formed on a guide plate in order to promote emission.
FIG. 3b is a graph to show a plotting of covering rate of the light control pattern.
Figure 4:
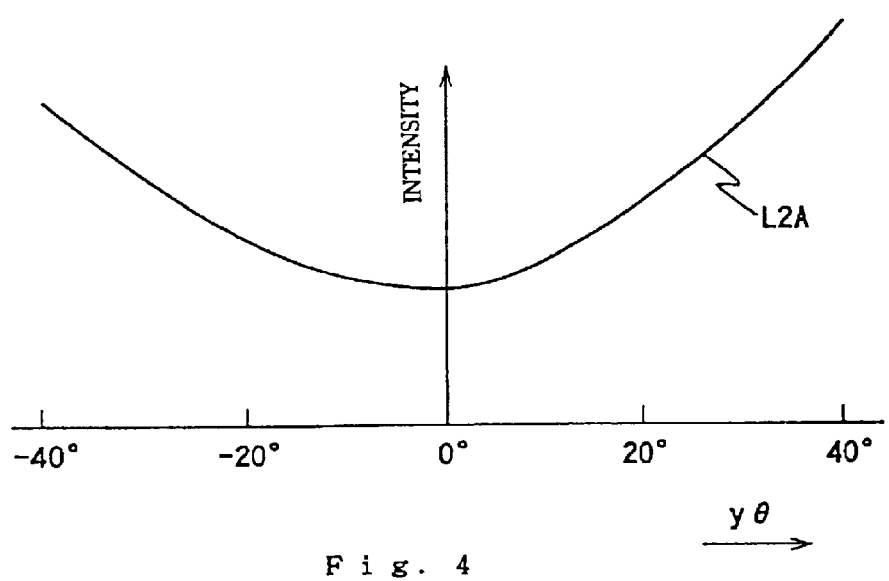
FIG. 4 is a graph to show directional characteristics of emission which is emitted from the back face and contributes to displaying.
Figure 5:
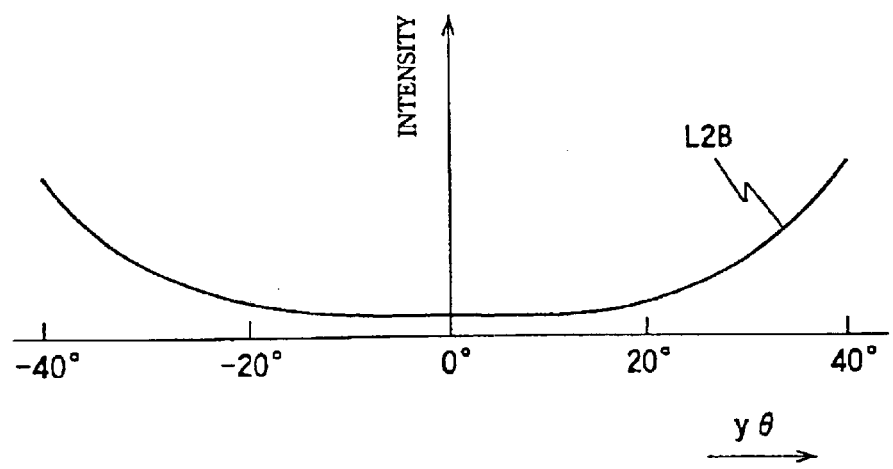
FIG. 5 is a graph to show directional characteristics of emission which is directly emitted from the back face.

Referring to FIGS. 4 and 5, directional characteristics of emission from the back face 25B of the guide plate 25 shown in FIG. 3, which is represented by a beam L2A and contributes to displaying, is plotted (FIG. 4); and directional characteristics of emission which is directly emitted from the back face 25B of the guide plate 25 shown in FIG. 3 is plotted (FIG. 5). The horizontal axis represents angles for direction indication and corresponds to y $\theta$ in FIG. 2. The vertical axis represents intensity of emission toward a direction of angle y $\theta$.

From comparison of both graphs, it is understood that the former marks much higher scores. Direct emission L2B from the back face 25B gives whitish background to the overall displayed image. Thereby the displayed image looks as if black-level portions are floating on the white background. This allows the present embodiment to provide display with high contrast and brightness.

Further, comparing the present embodiment with the prior arts shown in FIGS. 8 and 9, either ambient light or output light of the surface light source device is utilized for displaying image at an improved efficiency. This is because the reflection plate 23 does not cause ambient light to be leaked and output light of the surface light source device is inputted into the liquid crystal cells through no element having a low transmissivity (such as the reflection-transmission plate 5 in FIGS. 8 and 9).

Figure 6:
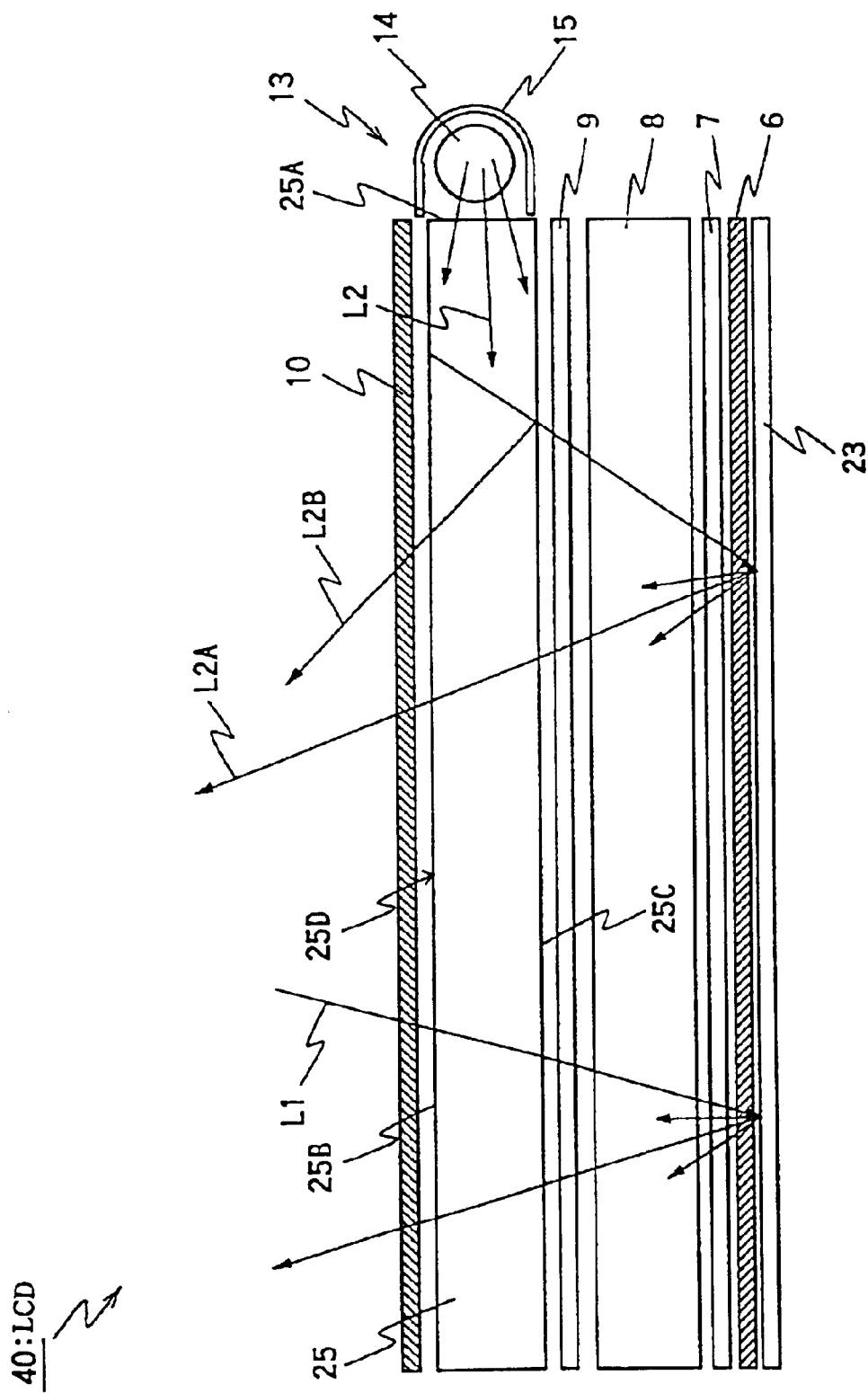
FIG. 6 is a cross section view of a liquid crystal display in accordance with another embodiment of the present invention.

Referring to FIG. 6, illustrated is a liquid crystal display in accordance with the another embodiment of the present invention. Elements used in common to the arrangements shown in FIG. 8, FIG. 9, FIG. 1 or FIG. 2 are indicated by common references, with repeated-descriptions being simplified.

A liquid crystal display 40 comprises a surface light source device of side light type disposed in front of (i. e. at the viewing side of) a liquid crystal layer 8. The present embodiment employs an arrangement such that the surface light source device is incorporated in a liquid crystal display panel to provide an auxiliary front-lighting means. Display screen is viewed from above in FIGS. 6.

In order from the back side (from the bottom in FIG. 6), laminatedly disposed are a reflection plate 23, a first polarization plate 6, a glass substrate 7, a liquid crystal layer 8, a glass substrate 9, a guide plate 25 and a second polarization plate 10. An important feature of the arrangement is that the guide plate 25 is interposed between the glass substrate 9 and the second polarization plate 10.

Transparent electrodes are formed on surfaces of the glass substrates 7 and 9, respectively, providing transparent electrode patterns between which a liquid crystal material is interposed and sealed to form the liquid crystal layer 8. Each liquid crystal cell rotates a polarization plane of light transmitting therethrough depending on voltage applied to the transparent electrodes.

Each of the polarization plates 6 and 10 permits a component corresponding to a certain direction of polarization plane (transmission polarization plane) to transmit exclusively. In general, the polarization plates 6 and 10 are orientated so that the transmission polarization plane of the first polarization plate 6 is either perpendicular or parallel to that of the second polarization plate 10.

The reflection plate 23 is a member provided with scattering property and high reflectivity with respect to light which is transmitted through the liquid crystal cells, having substantially no light transmissivity, which may be the same element as is employed in the previous embodiment.

On impinging of ambient light L1 to the liquid crystal display panel from above in FIG. 6, some component of the ambient light transmits through the polarization plate 10, the guide plate 25, the glass substrate 9, the liquid crystal layer 8, the glass substrate 7 and the polarization plate 6 to reach the reflection plate 23.

Quantity of light reaching the reflection plate 23 depends on factors including directions of transmission polarization planes of the polarization plates 6, 10 and state of the liquid crystal layer 8 (depending on voltage applied to the transparent electrodes).

The reflection plate 23 scatters and reflects ambient light L1. Substantially no light transmits through the reflection plate 23. Some component of the scattered and reflected light transmits through the polarization plate 6, the glass substrate 7, the liquid crystal layer 8, the glass substrate 9, the guide plate 25 and the polarization plate 10 in order, being emitted toward the outside to contribute to displaying.

Quantity of light emitting toward the outside varies depending on factors including directions of transmission polarization planes of the polarization plates 10, 6 and state of the liquid crystal layer 8 (depending on voltage applied to the transparent electrodes). According to this principle, bright-dark distribution is formed to provide image to be viewed.

The surface light source device is switched on usually when ambient light is short. The surface light source device 22 comprises a guide plate 25 and a primary light source 13 disposed beside the guide plate.

The primary light source 13 is composed of, for instance, a fluorescent lamp (cold cathode lamp) 14 and a reflector 15 backing the lamp. When the fluorescent lamp 14 is turned on, primary light is introduced into the guide plate 25 through an opening of the reflector 15 and an end face 25A of the guide plate. The guide plate 25 may be the same as employed in the previous embodiment.

That is, a back face (the upper face in FIG. 6) 25B of the guide plate 25 provides a light control face 25D which includes an emission promoting face for helping emission from an illumination output face 25C. The illumination output face 25C is a specular face having substantially no scattering power.

Illumination light L2 introduced into the guide plate 25 goes back and forth repeatedly between the back face 25B (light control face 25D) and the illumination output face 25C on the way of propagation. This process involves gradual emitting from the illumination output face 25C.

Some of the outputted illumination light from the illumination output face 25C transmits through the glass substrate 9, the liquid crystal layer 8, the glass substrate 7 and the polarization plate 6, reaching the reflection plate 23.

Quantity of light reaching the reflection plate 23 depends on factors including directions of transmission polarization planes of the polarization plates 10, 6 and state of the liquid crystal layer 8 (depending on voltage applied to the transparent electrodes).

The reflection plate 23 scatters and reflects the outputted illumination light. Substantially no light transmits through the reflection plate 23. Some component of the scattered and reflected light transmits through the polarization plate 6, the glass substrate 7, the liquid crystal layer 8, the glass substrate 9, the guide plate 25, the polarization plate 10 in order, being emitted toward the outside to provide light L2A contribute to displaying.

The quantity of light emitting toward the outside varies depending on factors including directions of transmission polarization planes of the polarization plates 10, 6 and state of the liquid crystal layer 8 (depending on voltage applied to the transparent electrodes). According to this principle, bright-dark distribution is formed to provide images to be viewed.

The light control face 25D is provided with emission promoting properties to promote emission of illumination light L2. These emission promoting properties tend to be at first stronger according to distance from the incidence face 25A and to be weaker thereafter. The reason why such reduced emission promoting properties are assigned to around a distal end is that a distal end face produces reflection light which will cause illumination output to be increased.

The present embodiment also employs emission promoting regions which are distributed on the back face 25B according to a light control pattern. The light control pattern is designed so that the above tendency is realized. The light control pattern illustrated in FIG. 3a may be employed in the present embodiment, too. Repeated descriptions on the light control pattern shown in FIG. 3a are omitted.

Comparing the present embodiment with the embodiment of FIG. 1, the followings will be understood. Any one of the embodiments do not succeed in perfect suppression of illumination light L2B which is directly emitted from the back face 25B of the guide plate 25.

However, the present embodiment nevertheless prevents a half of such illumination light L2B from escaping to the outside because the polarization plate 10 is arranged at the outside of the guide plate 25. Accordingly, white-ish background leading to reduced display of contrast is less conspicuous compared with the case of the embodiment of FIG. 1.

It is to be further noted that some of illumination light L2A emitted from the illumination output face 25C is emitted from the back face 25B after being reflected by an element such as the glass substrate 9 and penetrating through the guide plate 25. Such components fail to pass through the liquid crystal layer 8, too, thereby leading to no contribution to display contrast formation.

However, such components give only a small reduction in contrast because blocking by the polarization plate 10 is effected.

Besides, in the first embodiment, illumination light L2A passes through the polarization plate 10 twice before emitting to the outside. On the other hand, in the present embodiment, illumination light L2A passes through the polarization plate 10 only once before emitting to the outside. This reduces loss to improve display contrast and brightness.

Figure 7:
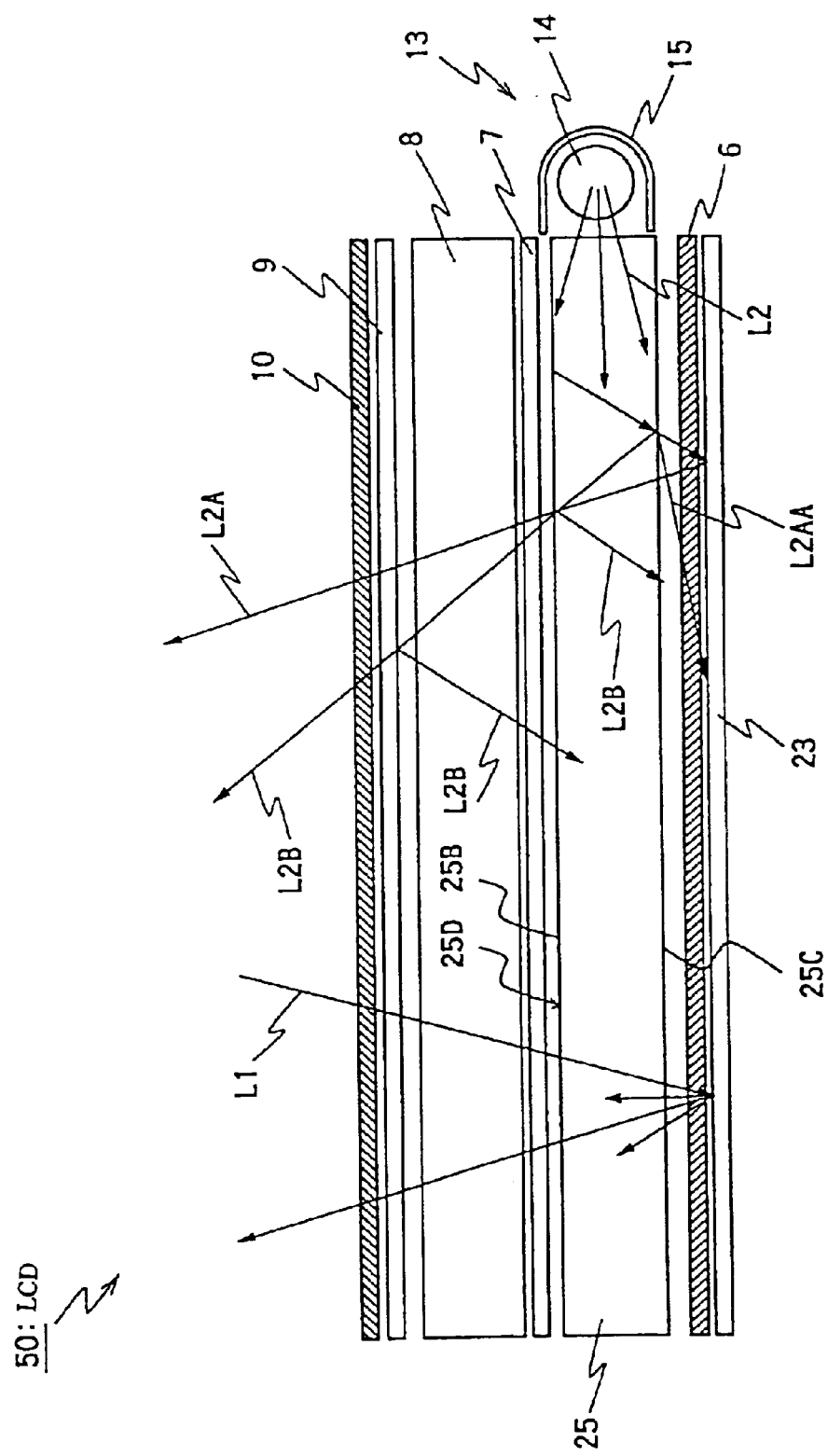
FIG. 7 is a cross section view of a liquid crystal display in accordance with yet another embodiment of the present invention.

Referring to FIG. 7, illustrated is a liquid crystal display in accordance with another embodiment of the present invention. Elements used in common to the arrangements shown in FIG. 8, FIG. 9, FIG. 1, FIG. 2 or FIG. 6 are indicated by common references, with repeated descriptions being simplified.

A liquid crystal display 50 comprises a surface light source device of side light type disposed behind a liquid crystal layer 8 (as viewed from the viewing side). According to an arrangement different from the arrangement of the previous embodiment, the surface light source device is incorporated in a liquid crystal display panel to provide an auxiliary front-lighting means. Display screen is viewed from above in FIGS. 7.

In order from the back side (from the bottom in FIG. 7), laminatedly disposed are a reflection plate 23, a first polarization plate 6, a guide plate 25, a glass substrate 7, a liquid crystal layer 8, a glass substrate 9 and a second polarization plate 10. An important feature of the arrangement is that the guide plate 25 is interposed between the second polarization plate 10 and the liquid crystal cell (in detail, the glass substrate 7).

Transparent electrodes are formed on surfaces of the glass substrates 7 and 9, respectively, providing transparent electrode patterns between which a liquid crystal material is interposed and sealed to form the liquid crystal layer 8. Each liquid crystal cell rotates a polarization plane of light transmitting therethrough depending on voltage applied to the transparent electrodes.

Each of the polarization plates 6 and 10 permits a component corresponding to a certain direction of polarization plane (transmission polarization plane) to transmit exclusively. In general, the polarization plates 6 and 10 are orientated so that the transmission polarization plane of the first polarization plate 6 is either perpendicular or parallel to that of the second polarization plate 10.

The reflection plate 23 is a member provided with scattering properties and high reflectivity with respect to light which is transmitted through the liquid crystal cells, having substantially no light transmissivity, which may be the same element as is employed in the embodiment of FIG. 1.

On impinging of ambient light L1 to the liquid crystal display panel from above in FIG. 7, some components of the ambient light transmit through the polarization plate 10, the glass substrate 9, the liquid crystal layer 8, the glass substrate 7, the guide plate 25 and the polarization plate 6 to reach the reflection plate 23.

Quantity of light reaching the reflection plate 23 depends on factors including directions of transmission polarization planes of the polarization plates 6, 10 and the state of the liquid crystal layer 8 (depending on voltage applied to the transparent electrodes).

The reflection plate 23 scatters and reflects ambient light L1. Substantially no light transmits through the reflection plate 23. Some component of the scattered and reflected light transmits through the polarization plate 6, the guide plate 25, the glass substrate 7, the liquid crystal layer 8, the glass substrate 9 and the polarization plate 10 in order, being emitted toward the outside to contribute to displaying.

Quantity of light emitting toward the outside vanes depending on factors including directions of transmission polarization planes of the polarization plates 10, 6 and the state of the liquid crystal layer 8 (depending on voltage applied to the transparent electrodes). According to this principle, bright-dark distribution is formed to provide images to be viewed.

When a fluorescent lamp 14 is turned on, primary light is introduced into the guide plate 25 through an opening of a reflector 15 and an end face 25A of the guide plate. The guide plate 25 may be the same as employed in the embodiment of FIG. 1 or the embodiment of FIG. 6. Attention should be paid to a fact that a back face 25B is directed to the liquid crystal cell (in detail, the glass substrate 7) and an illumination output face 25C is directed to the polarization plate 6.

The back face 25B provides a light control face 25D which includes an emission promoting face for helping emission from an illumination output face 25C. The illumination output face 25C is a specular face having substantially no scattering power.

Illumination light L2 introduced into the guide plate 25 goes back and forth repeatedly between the back face 25B (light control face 25D) and the illumination output face 25C on the way of propagation. This process involves gradual emitting from the back face 25B (light control face 25D) and the illumination output face 25C.

Some of the outputted illumination light from the illumination output face 25C transmits through the polarization plate 6 to reach the reflection plate 23. The proportion of light reaching the reflection plate 23 depends on a direction of the transmission polarization plane of the polarization plate 6.

The reflection plate 23 scatters and reflects the outputted illumination light. Substantially no light transmits through the reflection plate 23. Some component of the scattered and reflected light transmits through the polarization plate 6, the guide plate 25, the glass substrate 7, the liquid crystal layer 8, the glass substrate 9 and the polarization plate 10 in order, being emitted toward the outside to provide light L2A contributing to displaying.

The quantity of light emitting toward the outside varies depending on factors including the directions of transmission polarization planes of the polarization plates 10, 6 and the state of the liquid crystal layer 8 (depending on voltage applied to the transparent electrodes): According to this principle, bright-dark distribution is formed to provide images to be viewed.

The light control face 25D is provided with emission promoting properties to promote emission of illumination light L2. This emission promoting properties tend to be at first stronger according to distance from the incidence face 25A and to be weaker thereafter. The reason why such reduced emission promoting properties are assigned to around a distal end is that a distal end face produces reflection light which will cause illumination output to be increased.

The present embodiment also employs emission promoting regions which are distributed on the back face 25B according to a light control pattern. The light control pattern is designed so that the above tendency is realized. The light control pattern illustrated in FIG. 3a may be employed in the present embodiment also. Repeated descriptions on the light control pattern shown in FIG. 3a are omitted.

Comparing the present embodiment with the embodiments of FIGS. 1 and 6, the followings will be understood. As previously discussed, it is impossible to achieve perfect suppression of illumination light L2B which is directly emitted from the back face 25B of the guide plate 25.

However, the present embodiment is capable of restraining white-ish background which would lead to reduction in display contrast from appearing, because the liquid crystal cell is arranged at the outside of the guide plate 25.

Some of illumination light L2B is reflected by elements such as the glass substrates 7, 9 before reaching the polarization plate 10, returning to the guide plate 25. Such illumination light will be able to have a chance to be emitted from the illumination output face 25C. This results in less quantity of light which is consumed for forming white-ish background and in much quantity of light which contributes to forming display contrast, as compared with the embodiments of FIGS. 1 and 6.

The light control face 25D promotes inside propagating light L2 to be emitted, thereby causing the illumination output face 25C to emit such light as represented by illumination light L2AA in addition to frontal emission. This illumination light L2AA is greatly inclined with respect to a propagation direction of illumination light inside the guide plate 25 (from the right hand to the left hand, in FIG. 7).

In the above described embodiments of FIGS. 1 and 6, effective utilization of such oblique illumination light L2AA is hardly expected. On the other hand, the present embodiment permits some of such light to transmit through the polarization plate 6 and then to be scattered and reflected by the reflection plate 23. As a result, some of such light proceeds along paths similar to illumination light L2A, contributing to display. This will also leads to improvement in brightness and contrast.

None of the above embodiments aim to be limiting to the scope of the present invention. For instance, the following modifications fall within the scope of the present invention.

(a) In the above embodiments, each light control pattern is composed of a great number of circular dot regions, respectively. However, this imposes no limitation on the present invention. Other various shapes such as rectangular may be employed for regions forming a light control pattern.

(b) These fine regions may be other than roughened surface produced by mat-processing. For example, light scattering ink containing a pigment such as magnesium carbonate or titanium oxide may be selectively applied to a surface of a guide plate to provide a light control pattern.

(c) Further, micro-lens-like shapes may be formed on a surface of a guide plate by means of metal molding, printing or others to provide a light control pattern.

(d) In the above embodiments, each light control pattern is arranged with irregularity. However, this imposes no limitation on the present invention. So far as Moire fringes are prevented practically enough, arrangements with regularity are employable.

(e) In the above embodiments, the fine regions forming light control pattern have almost invisible dimensions. However, this imposes no limitation on the present invention. Unless displaying is prevented practically, sizes larger than the above stated are employable.

As to the covering rate, it may be designed flexibly according to the situation. For instance, each light control pattern is viewed across some additional elements such as the polarization plate in the embodiments of FIGS. 6 and 7. Accordingly, fine regions with sizes larger than the above stated data may be employed to form light control patterns.

(f) In the above embodiments, each glass substrate is a member and each polarization plate is another member. However, this imposes no limitation on the present invention.

These glass substrates and polarization plates may be unified. For example, unifying of glass substrate and polarization plate may be applied behind the liquid crystal layer in the embodiment of FIG. 6, in front of the liquid crystal layer in the embodiment of FIG. 7 and at the both sides of the liquid crystal layer in the embodiment of FIG. 1, respectively.

(g) In the above-described embodiments, transparent guide plates are employed. However, this imposes no limitation on the present invention. Various materials may be employed so far as effects are performed in common with the above-described embodiments. For instance, a scattering guide plate provided with inside scattering power may be employed.

(h) The surface light source devices in the above-described embodiments are supplied with primary light from rod-shaped light sources (fluorescent lamps). However, this imposes no limitation on the present invention. For example, a primary light source provided with an arrangement including a plurality of point-like light source elements such as LEDs may be employed.

What is claimed is:

1. A surface light source device of side light type applied to auxiliary lighting in a liquid crystal display including a reflection plate and a liquid crystal display panel having a front face for being supplied with ambient light and a back face along which said reflection plate is disposed, comprising:
    a guide plate; and
    a primary light source to supply primary light to an incidence end face provided by a minor face of the guide plate, said guide plate having major faces to provide a back face and an illumination output face, wherein
    said illumination output face is provided with no light scattering property and supplies light toward said front face of said liquid crystal display panel;
    said back face provides a light control face provided with emission promoting properties which help light propagating within the guide plate to escape from said illumination output face by substantially scattering the light.

2. A surface light source device of side light type in accordance with claim 1, wherein said light control face comprises a number of dot-like fine regions to promote emission.

3. A surface light source device of side light type if accordance with claim 2, wherein said dot-like fine regions are arranged with irregularity.

4. A surface light source device of side light type if accordance with claim 2, wherein said dot-like fine regions are roughened partial regions in said back face.

5. A surface light source device of side light type if accordance with claim 3, wherein said dot-like fine regions are roughened partial regions in said back face.

6. A surface light source device of side light type in accordance with any one of claims 2, 3, 4 or 5, wherein said fine regions have such dimensions respectively as to make the fine regions almost invisible.

7. A surface light source device of side light type in accordance with any one of claims 2, 3, 4 or 5, wherein at least a part of said back face is provided with emission promoting property which tends to be stronger according to distance from said incidence end face.

8. A surface light source device of side light type in accordance with claim 6, wherein at least a part of said back face is provided with emission promoting property which tends to be stronger according to distance from said incidence end face.

9. A liquid crystal display comprising:
    a liquid crystal display panel having a front face for being supplied with ambient light and a back face;
    a reflection plate disposed along said back face of said liquid crystal display panel, and
    a surface light source device of side light type for auxiliary lighting, wherein
    said surface light source device of side light type comprises a guide plate and a primary light source to supply primary light to an incidence end face provided by a minor face of the guide plate and said guide plate having major faces to provide a back face and an illumination output face; wherein
    said illumination output face is provided with no light scattering property and supplies light toward said front face of said liquid crystal display panel; and,
    said back face provides a light control face provided with emission promoting properties which help light propagating within the guide plate to escape from said illumination output face by substantially scattering the light.

10. A liquid crystal display in accordance with claim 9, wherein said light control face comprises a great number of dot-like fine regions to promote emission.

11. A liquid crystal display in accordance with claim 10, wherein said dot-like fine regions are arranged with irregularity.

12. A liquid crystal display in accordance with claim 10, wherein said dot-like fine regions are roughened partial regions in said back face.

13. A liquid crystal display in accordance with claim 11, wherein said dot-like fine regions are roughened partial regions in said back face.

14. A liquid crystal display in accordance with any one of claims 10, 11 or 12, wherein said fine regions have such dimensions respectively as to make the fine regions almost invisible.

15. A liquid crystal display in accordance with any one of claims 9, 10, 11, 12 or 13, wherein at least a part of said back face is provided with emission promoting property which tends to be stronger according to distance from said incidence end face.

16. A liquid crystal display in accordance with claim 14, wherein said back face is provided with emission promoting property which tends to be stronger according to distance from said incidence end face.

17. A liquid crystal display comprising:
a liquid crystal layer being supplied with ambient light from a front side of the liquid crystal layer;
a reflection plate disposed at a back side of said liquid crystal layer;
a first polarization plate interposed between said liquid crystal layer and said reflection plate;
a second polarization plate disposed at the front side of said liquid crystal layer; and,
a surface light source device of side light type for auxiliary lighting which comprises a guide plate and a primary light source to supply primary light to an incidence end face provided by a minor face of the guide plate, said guide plate having major faces to provide a back face and an illumination output face, wherein
said illumination output face is provided with no light scattering property,
said back face provides a light control face provided with emission promoting properties which help light propagating within the guide plate to escape from said illumination output face by substantially scattering the light; and
said guide plate being interposed between said liquid crystal layer and the second polarization plate so that said illumination output face is directed to the front side of said liquid crystal layer.

18. A liquid crystal display in accordance with claim 17, wherein said light control face is provided with a great number of dot-like fine regions to promote emission.

19. A liquid crystal display in accordance with claim 18, wherein said dot-like fine regions are arranged with irregularity.

20. A liquid crystal display in accordance with claim 18, wherein said dot-like fine regions are roughened partial regions in said back face.

21. A liquid crystal display in accordance with claim 19, wherein said dot-like fine regions are roughened partial regions in said back face.

22. A liquid crystal display in accordance with any one of claims 18, 19, 20 or 21, wherein said fine regions have such dimensions respectively as to make the fine regions almost invisible.

23. A liquid crystal display in accordance with any one of claims 18, 19, 20 or 21, wherein at least a part of said back face or said illumination output face is provided with emission promoting property which tends to be stronger according to distance from said incidence end face.

24. A liquid crystal display in accordance with claims 22, wherein at least a part of said back face or said illumination output face is provided with emission promoting property which tends to be stronger according to distance from said incidence end face.

25. A surface light source device as recited in claim 1, wherein the back face substantially scatters the light and substantially reflects the light.

26. A surface light source device as recited in claim 1, wherein the substantial scattering is effectuated by a scattering unit designed to scatter light.

* * * * *

UNITED STATES PATENT AND TRADEMARK OFFICE
CERTIFICATE OF CORRECTION

PATENT NO. : 6,791,635 B1
APPLICATION NO. : 09/273449
DATED : September 14, 2004
INVENTOR(S) : Shingo Ohkawa et al.

It is certified that error appears in the above-identified patent and that said Letters Patent is hereby corrected as shown below:

Title Page:

(57) Abstract - Line 19, change "thus" to -- the--

Col. 14, line 8, change "if" to --in--

Col. 14, line 11, change "if" to --in--

Col. 14, line 14, change "if" to --to--

Signed and Sealed this

Twelfth Day of December, 2006

JON W. DUDAS
*Director of the United States Patent and Trademark Office*